US012590561B2

(12) United States Patent
Bucaro et al.

(10) Patent No.: US 12,590,561 B2
(45) Date of Patent: Mar. 31, 2026

(54) COMBUSTOR WITH LEAN OPENINGS

(71) Applicant: GENERAL ELECTRIC COMPANY, Cincinnati, OH (US)

(72) Inventors: Michael T. Bucaro, Arvada, CO (US); Manampathy G. Giridharan, Evendale, OH (US); Pradeep Naik, Bengaluru (IN); Sripathi Mohan, Bengaluru (IN); Michael A. Benjamin, Cincinnati, OH (US); Steven C. Vise, Evendale, OH (US); Ajoy Patra, Bengaluru (IN); Perumallu Vukanti, Bengaluru (IN); R Narasimha Chiranthan, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 84 days.

(21) Appl. No.: 18/742,260

(22) Filed: Jun. 13, 2024

(65) Prior Publication Data

US 2024/0328360 A1    Oct. 3, 2024

Related U.S. Application Data

(63) Continuation of application No. 17/717,636, filed on Apr. 11, 2022, now Pat. No. 12,031,486.

(30) Foreign Application Priority Data

Jan. 13, 2022    (IN) .............................. 202211002027

(51) Int. Cl.
*F02C 7/232*    (2006.01)
*F23R 3/34*    (2006.01)

(52) U.S. Cl.
CPC ................ *F02C 7/232* (2013.01); *F23R 3/34* (2013.01)

(58) Field of Classification Search
CPC ............ F02C 7/232; F02C 7/228; F23R 3/34
See application file for complete search history.

(56) References Cited

U.S. PATENT DOCUMENTS

| | | | |
|---|---|---|---|
| 5,197,289 A | 3/1993 | Glevicky et al. |
| 5,285,632 A | 2/1994 | Halila |
| 5,303,542 A | 4/1994 | Hoffa |
| 6,058,710 A | 5/2000 | Brehm |
| 6,360,525 B1 | 3/2002 | Senior et al. |
| 6,871,501 B2 | 3/2005 | Bibler et al. |

(Continued)

FOREIGN PATENT DOCUMENTS

| | | |
|---|---|---|
| CN | 103277813 A | 9/2013 |
| CN | 106687745 A | 5/2017 |

(Continued)

OTHER PUBLICATIONS

Chinese Office Action for Application No. 202210656706.8 dated Jun. 24, 2025 with English translation, 16 pages.

(Continued)

*Primary Examiner* — David P. Olynick
(74) *Attorney, Agent, or Firm* — Carter, DeLuca & Farrell LLP

(57) ABSTRACT

A turbine engine and method of operation with a combustor as shown and described. The turbine engine including a combustor comprising an annular array of rich cups and an annular array of lean cups. A method for controlling nitrogen oxides including injecting a fuel/air mixture from the lean cups and the rich cups.

18 Claims, 8 Drawing Sheets

(56) References Cited

U.S. PATENT DOCUMENTS

| | | | |
|---|---|---|---|
| 8,365,536 | B2 | 2/2013 | Khan et al. |
| 8,424,311 | B2 | 4/2013 | York et al. |
| 8,590,311 | B2 | 11/2013 | Parsania et al. |
| 9,534,790 | B2 | 1/2017 | Cai et al. |
| 10,132,500 | B2 | 11/2018 | Ryon et al. |
| 10,208,958 | B2 | 2/2019 | Carroni et al. |
| 10,731,861 | B2 | 8/2020 | Schlein |
| 2005/0132716 | A1 | 6/2005 | Zupanc et al. |
| 2005/0252218 | A1 | 11/2005 | Chen et al. |
| 2007/0151248 | A1 | 7/2007 | Scarinci et al. |
| 2012/0031102 | A1 | 2/2012 | Uhm et al. |
| 2013/0091824 | A1 | 4/2013 | Murakami et al. |
| 2014/0069079 | A1 | 3/2014 | Koizumi et al. |
| 2014/0075949 | A1 | 3/2014 | Prociw et al. |
| 2017/0234219 | A1 | 8/2017 | Barve et al. |
| 2020/0102888 | A1 | 4/2020 | Stevenson |
| 2023/0080006 | A1 | 3/2023 | Swann et al. |

FOREIGN PATENT DOCUMENTS

| | | | |
|---|---|---|---|
| CN | 108800206 | A | 11/2018 |
| EP | 2589877 | A2 | 5/2013 |
| EP | 3109557 | A2 | 12/2016 |
| EP | 2407720 | B1 | 10/2019 |
| GB | 2429516 | B | 12/2010 |
| JP | 2009287888 | A | 12/2009 |
| JP | 2011232023 | A | 11/2011 |

OTHER PUBLICATIONS

EP Office Action for application No. 22 168 856.7 dated May 20, 2025, 7 pages.

Chinese Office Action for Application No. 202210656706.8 dated Dec. 29, 2025 with English translation, 10 pages.

Chinese Office Action for Application No. 20210656706.8 dated Feb. 3, 2026 with English translation, 16 pages.

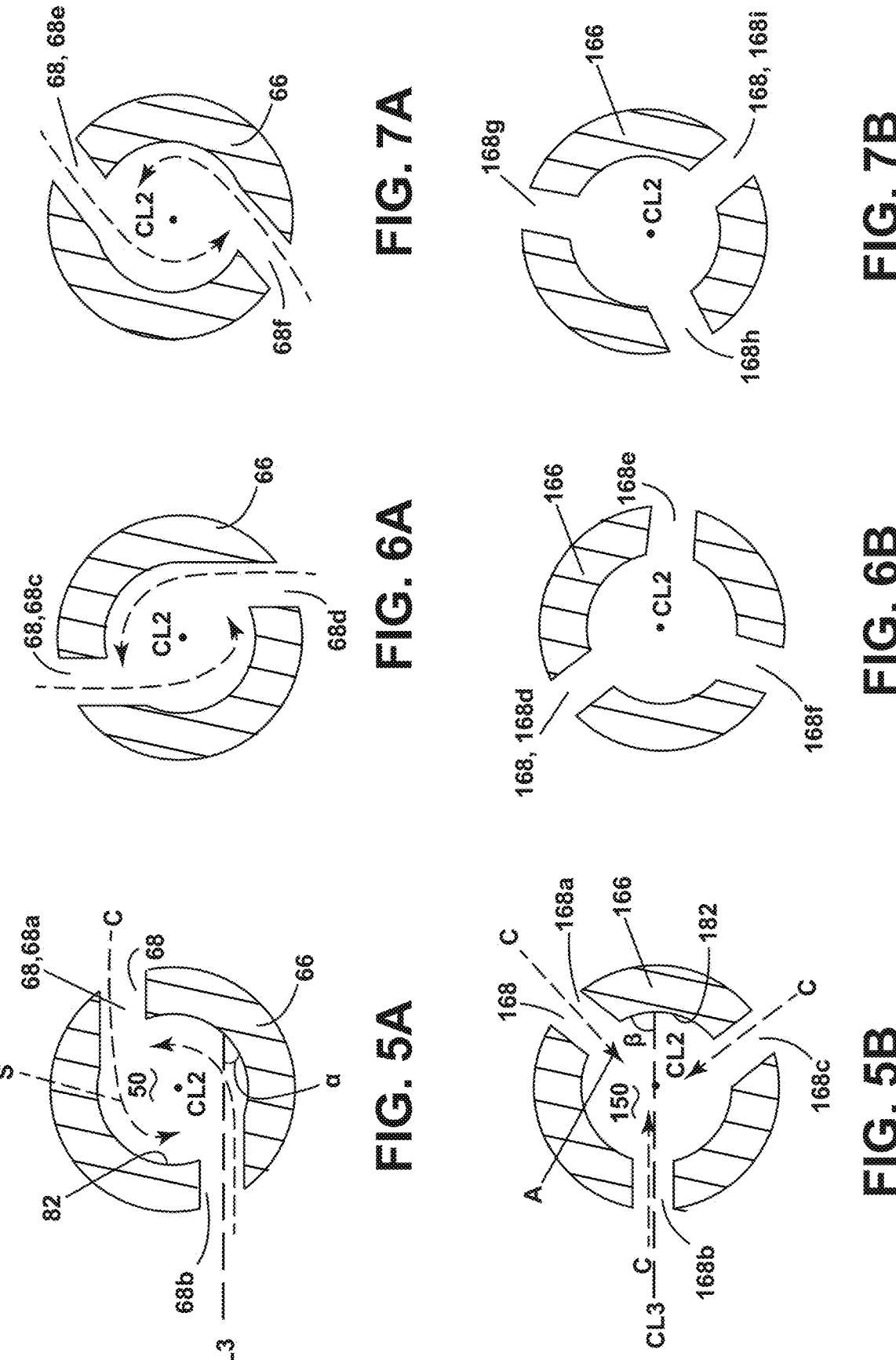

COMBUSTOR WITH LEAN OPENINGS

CROSS-REFERENCE TO RELATED APPLICATIONS

This application is a continuation application of U.S. patent application Ser. No. 17/717,636, filed Apr. 11, 2022, now allowed, which claims priority to IN Provisional Application Serial No. 202211002027, filed Jan. 13, 2022, the contents of which are incorporated herein by reference.

TECHNICAL FIELD

The present subject matter relates generally to a combustor, for a turbine engine, and more specifically to a lean combustor.

BACKGROUND

Turbine engines are driven by a flow of combustion gases passing through the engine to rotate a multitude of turbine blades, which, in turn, rotate a compressor to provide compress air to the combustor for combustion. A combustor can be provided within the turbine engine and is fluidly coupled with a turbine into which the combusted gases flow.

The use of hydrocarbon fuels in the combustor of a turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called $NO_x$), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

Varieties of fuel for use in combustion turbine engines are being explored. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically has a wider flammable range and a faster burning velocity than traditional fuels such petroleum-based fuels, or petroleum and synthetic fuel blends.

Standards stemming from air pollution concerns worldwide regulate the emission of $NO_x$, UHC, and CO generated as a result of the turbine engine operation. In particular, $NO_x$ is formed within the combustor as a result of high combustor flame temperatures during operation. It is desirable to decrease $NO_x$ emissions while still maintaining desirable efficiencies by regulating the profile and or pattern within the combustor.

BRIEF DESCRIPTION OF THE DRAWINGS

In the drawings:

FIG. 5A is a cross-section of the passage taken along line V-V of FIG. 4 illustrating a passage inlet.

FIG. 5B is a cross-section of a passage illustrating a variation of the passage inlet from FIG. 5A according to an aspect of the disclosure herein.

FIG. 6A is a cross-section of the passage taken along line VI-VI of FIG. 4 illustrating a passage inlet axially downstream the passage inlet from FIG. 5A.

FIG. 6B is a cross-section of a passage illustrating a variation of the passage inlet from FIG. 6A according to an aspect of the disclosure herein.

FIG. 7A is a cross-section of the passage taken along line VII-VII of FIG. 4 illustrating a passage inlet axially downstream the passage inlet from FIG. 6A.

FIG. 7B is a cross-section of a passage illustrating a variation of the passage inlet from FIG. 7A according to an aspect of the disclosure herein.

DETAILED DESCRIPTION

Figure 1:
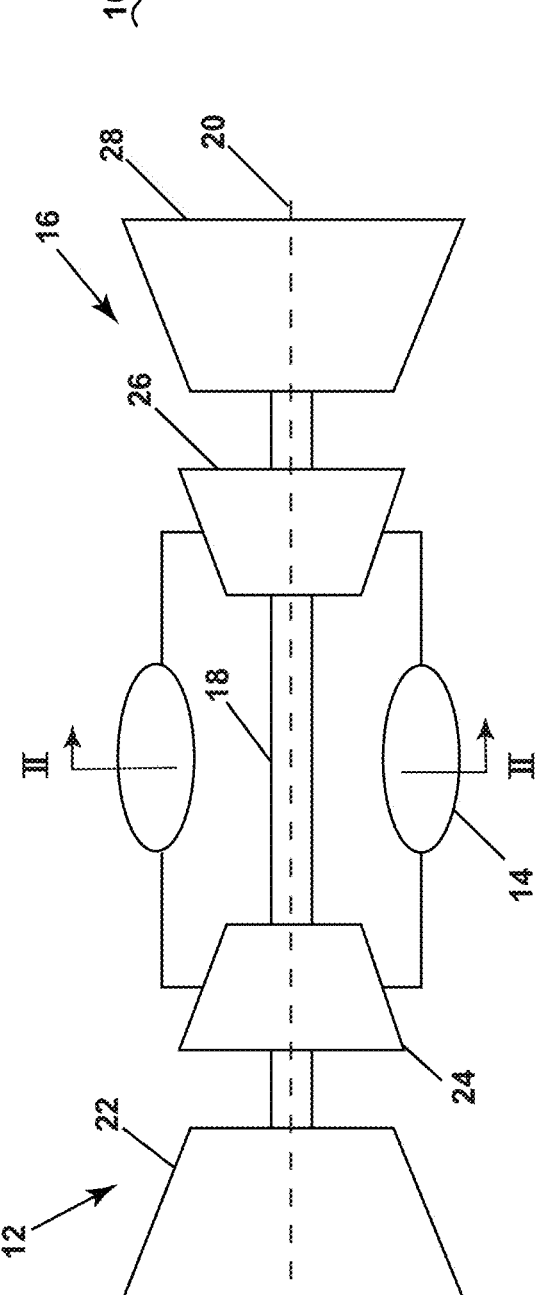
FIG. 1 is a schematic of a turbine engine.

Aspects of the disclosure described herein are directed to a combustor, and in particular a combustor with at least one rich cup and a set of lean openings. For purposes of illustration, the present disclosure will be described with respect to a turbine engine. It will be understood, however, that aspects of the disclosure described herein are not so limited and that a combustor as described herein can be implemented in engines, including but not limited to turbo-jet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward"

means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) may be used for identification purposes to aid the reader's understanding of the present disclosure, and do not create limitations, particularly as to the position, orientation, or use of aspects of the disclosure described herein. Connection references (e.g., attached, coupled, connected, and joined) may be used and are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis or centerline 20 for the turbine engine 10.

The compressor section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the turbine engine 10 via an exhaust section (not illustrated) downstream of the turbine section 16. The driving of the LP turbine 26 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
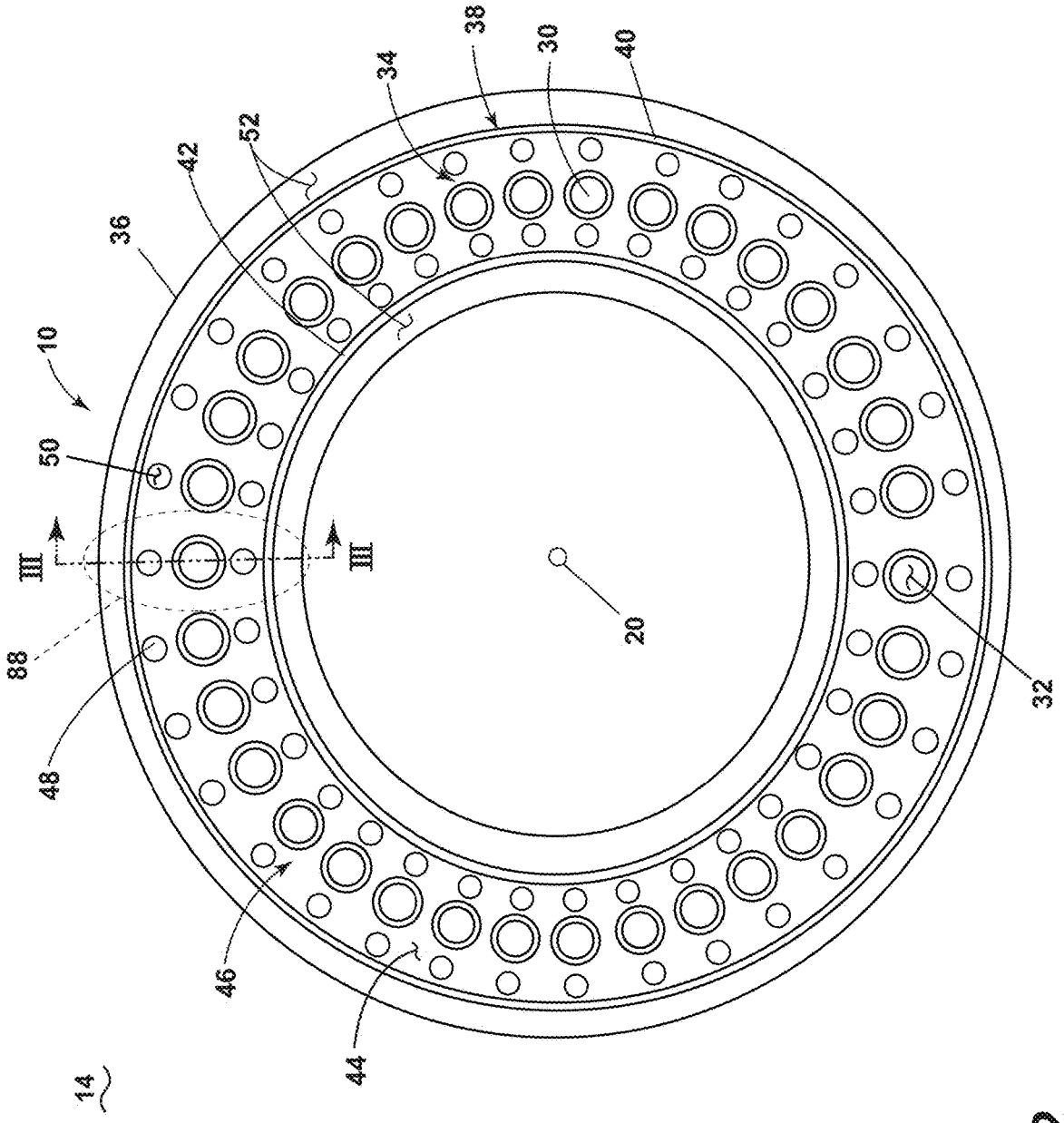
FIG. 2 depicts a cross-sectional view along line II-II of FIG. 1 of a combustion section of the turbine engine with a set of lean openings.

FIG. 2 depicts a cross-section view of the combustion section 14 along line II-II of FIG. 1. The combustion section 14 can include an annular arrangement of fuel injectors 30 disposed around the centerline 20 of the turbine engine 10. Each of the fuel injectors 30 can define at least one rich cup 32 fluidly connected to a combustor 34. It should be appreciated that the annular arrangement of fuel injectors can be one or multiple fuel injectors and one or more of the fuel injectors 30 can have different characteristics. The combustor 34 can have a can, can-annular, or annular arrangement depending on the type of engine in which the combustor 34 is located. In a non-limiting example, an annular arrangement is illustrated and disposed within a casing 36. The combustor 34 is defined by a combustor liner 38 including an outer annular combustor liner 40 and an inner annular combustor liner 42 concentric with respect to each other and annular about the engine centerline 20. A dome wall 44 together with the combustor liner 38 can define a combustion chamber 46 annular about the engine centerline 20. A set of lean openings 48 can be located in the dome wall 44. At least one lean opening in the set of lean openings 48 can define at least one lean cup 50. The at least one lean cup 50 along with the at least one rich cup 32 can be annularly arranged about the engine centerline 20 and fluidly coupled to the combustion chamber 46. The at least one lean cup 50 can be multiple lean cups 50 interspersed amongst a plurality of rich cups 32 as illustrated. The at least one lean cup 50 be located radially outward and radially inward from the at least one rich cup 32. A compressed air passageway 52 can be defined at least in part by both the combustor liner 38 and the casing 36. As described herein the rich cups 32 define an area where a rich mixture of air and fuel is provided having a ratio of air to fuel that is lower than a stoichiometric air to fuel ratio for the utilized aviation fuel. The lean cups 50 define an area where a lean mixture of air and fuel is provided having a ratio of fuel to air with a higher concentration of air such that the ratio of air to fuel is higher than the stoichiometric air to fuel ratio.

The at least one lean cup 50 can control dynamics, reduce NO$_x$, and increase the life of the combustor liner 38. Balancing the introduction of a lean mixture with a rich mixture can provide challenges for engine designers to develop with regards to both stable operation and low NO$_x$ emissions over the full range of engine conditions. The exemplary arrangement of the lean cups 50 with respect to the rich cups 32 described herein can provide this necessary and beneficial balance.

Figure 3:
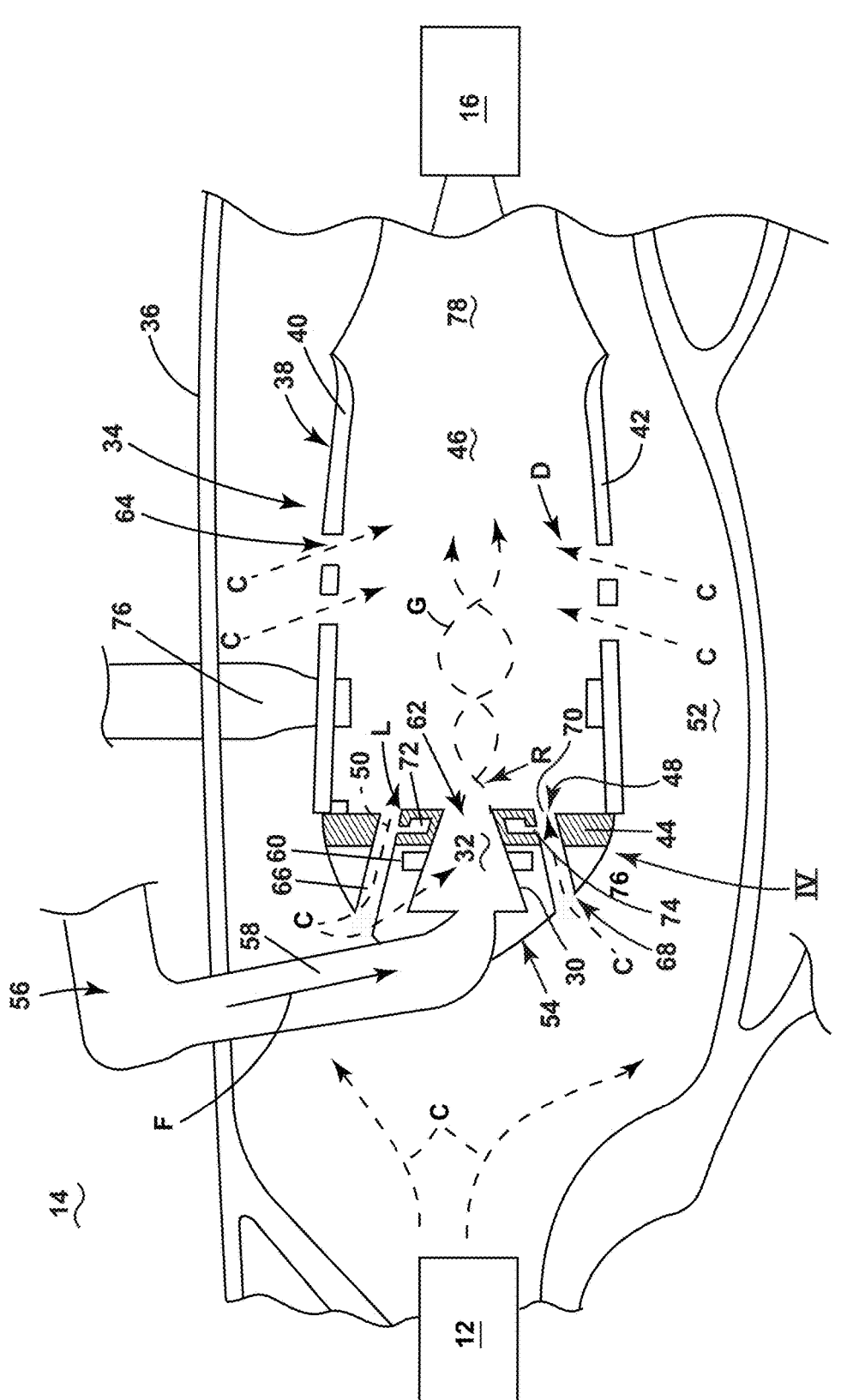
FIG. 3 is a cross-sectional view taken along line III-III of FIG. 2 of the combustor in the combustion section with a fuel injector and the set of lean openings located in a dome wall.

FIG. 3 depicts a cross-sectional view taken along line III-III of FIG. 2 illustrating the combustion section 14. A dome assembly 54 can house the fuel injector 30. The fuel injector 30 can be fluidly coupled to a fuel inlet 56 via a fuel passageway 58 that can be adapted to receive a flow of fuel (F). In some implementations the fuel injector 30 can include a swirler 60. Compressed air (C) can be provided to the combustion section 14 from the compressor section 12 via the compressed air passageway 52. The fuel injector 30 can terminate in a dome inlet 62. A set of dilution openings 64 can be provided in the combustor liner 38 for connecting the compressed air passageway 52 and the combustion chamber 46.

A passage 66 can extend between at least one passage inlet 68 and a passage outlet 70. The passage outlet 70 can define the set of lean openings 48. At least one fuel chamber 72 can be provided within the dome wall 44. The at least one fuel chamber 72 can be fluidly coupled to the passage 66 by a set of fuel channels 74. The set of fuel channels 74 can be a single channel extending between the at least one fuel chamber 72 and the passage 66, or multiple channels providing multiple entries to the passage 66.

During operation, compressed air (C) can be fed into the fuel injector 30 and mixed with fuel (F) to define a rich fuel/air (R) mixture. The rich fuel/air mixture when ignited produces a consistent flame. The swirler 60 can swirl incoming compressed air (C) with fuel (F) entering the rich cup 32 to provide a homogeneous mixture of air and fuel entering the combustion chamber 46 via the dome inlet 62.

Further, compressed air (C) can be fed into the passage 66 and mixed with fuel (F) from the at least one fuel chamber 72 to define a lean fuel/air mixture (L). The lean fuel/air mixture (L) when ignited produces a low-emissions flame. The passage 66 can be angled toward the rich cup 32 in order to mix the lean fuel/air mixture (L) with the rich fuel/air mixture (R) to provide a homogeneous mixture of air and fuel within the combustion chamber 46. Together the mixtures (R), (L) produce a hybrid flame having characteristics of the consistent flame and the low-emissions flame.

The mixture can be ignited within the combustion chamber 46 by one or more igniters 76 to generate combustion gas (G). Compressed air (C) can additionally enter the combustion chamber 46 via the set of dilution openings 64 to provide a dilution flow (D) within the combustion chamber 46. The combustion gas (G) can be mixed using the dilution flow (D) or simply controlled by the dilution flow (D) to move through a combustor outlet 78 and exit into the turbine section 16.

Figure 4:
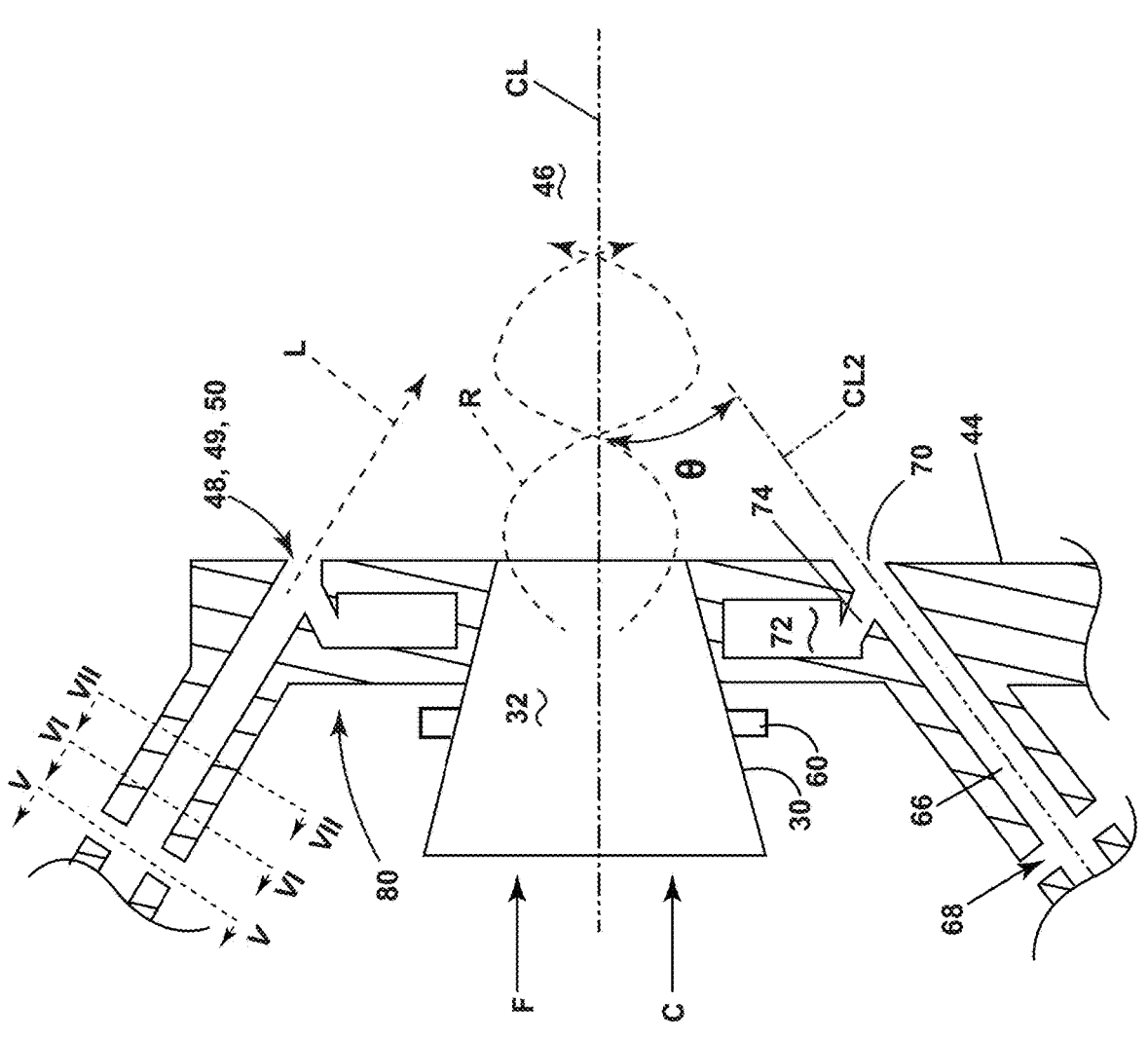
FIG. 4 is an enlarged view of portion IV from FIG. 3 illustrating a passage defining the set of lean openings surrounding the fuel injector and extending through the dome wall.

FIG. 4 is an enlarged schematic of portion IV from FIG. 3. The fuel injector 30 can define a primary centerline (CL). Each passage 66 defining the set of lean cups 50 also define a secondary centerline (CL2). Each passage 66 can be angled toward the primary centerline (CL) such that the secondary centerline (CL2) intersects the primary centerline (CL) to define a tube angle (θ). The tube angle (θ) can be an acute angle between 0 and 90 degrees. Each passage 66 enables shaping of a flame by providing air for hydrogen combustion where the air can be supplied at certain power settings to reduce overall NO$_x$ production.

In one aspect of the disclosure, the at least one lean opening in the set of lean openings 48 together with the passage 66, the at least one fuel chamber 72, and the set of fuel channels 74 can define a lean fuel circuit 80. The lean fuel circuit 80 can be turned off to define a dilution hole 49 at the passage outlet 70 and turned on to define the lean cup 50. At different operating conditions the lean fuel circuit 80 is therefore turned off and on to balance operability, NO$_x$ emissions, and overall component life. The dome wall 44 can be cooled by fuel stored in the at least one fuel chamber 72. The fuel can be H$_2$ fuel and fed into the passage 66 when the lean fuel circuit 80 is on. When the lean fuel circuit 80 is off the H$_2$ fuel can remain stored in the at least one fuel chamber 72 while also cooling the dome wall 44.

When the lean fuel circuit 80 is off, the set of fuel channels 74 can be closed such that fuel (F) is cut off from the passage 66. Compressed air (C) can still be provided to the at least one passage inlet 68 such that the set of lean openings 48 can provide compressed air (C) to the combustion chamber 46. In some implementations the compressed air (C) can be swirled at a low swirling amount (0.05 to 0.2). In other implementations the compressed air (C) can be non-swirling air and impinge on the rich fuel/air mixture (R) to keep the flame produced by the rich fuel/air mixture (R) away from the combustor liner 38 (FIG. 3). The set of lean openings 48 therefore act as dilution jets pushing the rich fuel/air mixture (R) from the at least one rich cup 32 inward toward the primary centerline (CL).

When the lean fuel circuit 80 is on, the set of lean openings 48 can provide the lean fuel/air mixture (L). In some implementations the lean fuel/air mixture (L) can be swirled at a low swirling amount (0.05 to 0.2). In other implementations the lean fuel/air mixture (L) can be non-swirling air and impinge on the rich fuel/air mixture (R) to control the flame produced by the rich fuel/air mixture (R) and prevent spreading of the rich fuel/air mixture (R) onto the combustor liner 38 (FIG. 3).

FIG. 5A is a cross-section of the passage 66 taken along line V-V of FIG. 4 illustrating the at least one passage inlet 68. The passage 66 can have an inner surface 82 defining the at least one lean cup 50. In an aspect of the disclosure herein, the at least one passage inlet 68 is multiple passage inlets, illustrated as a first passage inlet 68a and a second passage inlet 68b, circumferentially disposed with respect to the secondary centerline (CL2) around the passage 66. Each passage inlet 68 defines a third centerline (CL3) that intersects the inner surface 82 at a surface angle (α). In some implementations the surface angle (α) is a shallow angle equal to or less than 30 degrees. The first and second passage inlets 68a, 68b can be disposed such that the third centerline (CL3) intersects the inner surface 82 opposite the at least one passage inlet 68. The first passage inlet 68a can be disposed radially above the secondary centerline (CL2) with respect to the cross-sectional line V-V in FIG. 4, while the second passage inlet 68b is disposed radially below the secondary centerline (CL2). In other words, the first and second passage inlets 68a, 68b are unaligned with the secondary centerline (CL2). During operation compressed air (C) entering the passage 66 via the multiple passage inlets 68a, 68b becomes a low swirling jet (S) of compressed air (C) and can be utilized for swirling as previously described herein.

FIG. 5B is a cross-section of a variation of passage 66 of FIG. 5A, taken at generally a similar location as that of FIG. 5A, illustrating a passage inlet 168, a variation of the at least one passage inlet 68 of FIG. 5A, according to another aspect of the disclosure herein. The passage inlet 168 is substantially similar to the at least one passage inlet 68, therefore, like parts will be identified with like numerals increased by 100. It should be understood that the description of the like parts of the at least one passage inlet 68 of FIG. 5A applies to the passage inlet 168 of FIG. 5B unless otherwise noted.

A passage 166 can have an inner surface 182 defining at least one lean cup 150. In an aspect of the disclosure herein, the passage inlet 168 includes multiple passage inlets, illustrated as a first passage inlet 168a, a second passage inlet 168b, and a third passage inlet 168c circumferentially disposed with respect to a secondary centerline (CL2) around the passage 166. Each passage inlet 168 defines a third centerline (CL3) that intersects the inner surface 182 at a surface angle (β). While only one third centerline (CL3) is illustrated, it should be understood that each passage inlet 168 includes the third centerline (CL3). In some implementations the surface angle (β) is a perpendicular angle between 85 and 95 degrees. Each of the first, second, and third passage inlets 168a, 168b, 168c can be disposed such that the third centerline (CL3) intersects the inner surface 182 opposite the passage inlet 168. The first, second, and third passage inlets 168a, 168b, 168c can be oriented annularly around the secondary centerline (CL2) such that the third centerline (CL3) and the secondary centerline (CL2) intersect. During operation compressed air (C) entering the passage 166 via the first, second, and third passage inlets 168a, 168b, 168c becomes a radial air jet (A) of compressed air (C) and can be utilized for impingement as previously described herein.

FIG. 6A is a cross-section of the passage 66 taken along line VI-VI of FIG. 4 illustrating the at least one passage inlet 68. This cross-section is taken axially spaced and downstream from the cross-section of FIG. 5A. The at least one passage inlet 68 can include multiple passage inlets 68c, 68d axially and circumferentially spaced and disposed downstream with respect to the secondary centerline (CL2) from the first and second passage inlets 68a, 68b (FIG. 5A) around the passage 66.

FIG. 6B is a cross-section of a variation of passage 66 of FIG. 6A, taken at generally a similar location as that of FIG. 6A, illustrating at least one passage inlet 168, a variation of the at least one passage inlet 68 of FIG. 6A, according to another aspect of the disclosure herein. This cross-section is taken axially spaced and downstream from the cross-section of FIG. 5B. The at least one passage inlet 168 can include multiple passage inlets 168d, 168e, 168f axially and circumferentially spaced and disposed downstream with respect to the secondary centerline (CL2) from the first, second, and third passage inlets 168a, 168b, 168c (FIG. 5B) around the passage 166.

FIG. 7A is a cross-section of the passage 66 taken along line VII-VII of FIG. 4 illustrating the at least one passage inlet 68. This cross-section is taken axially spaced and downstream from the cross-section of FIG. 6A. The at least one passage inlet 68 can include multiple passage inlets 68e, 68f axially and circumferentially spaced and disposed downstream with respect to the secondary centerline (CL2) from the multiple passage inlets 68c, 68d (FIG. 6A) around the passage 66.

FIG. 7B is a cross-section of a variation of passage 66 of FIG. 7A, taken at generally a similar location as that of FIG. 7A, illustrating at least one passage inlet 168, a variation of the at least one passage inlet 68 of FIG. 7A, according to another aspect of the disclosure herein. This cross-section is taken axially spaced and downstream from the cross-section of FIG. 6B. The at least one passage inlet 168 can include multiple passage inlets 168g, 168h, 168i axially and circumferentially spaced and disposed downstream with respect to the secondary centerline (CL2) from the multiple passage inlets 168d, 168e, 168f (FIG. 6B) around the passage 166.

FIGS. 5A-7B are for illustrative purposes only. The at least one passage inlet described herein can be oriented anywhere from tangential to perpendicular with respect to the inner surface. The at least one passage inlet can be multiple holes in an array and at any circumferential clocking orientation with respect to the secondary centerline (CL2).

Figure 8:
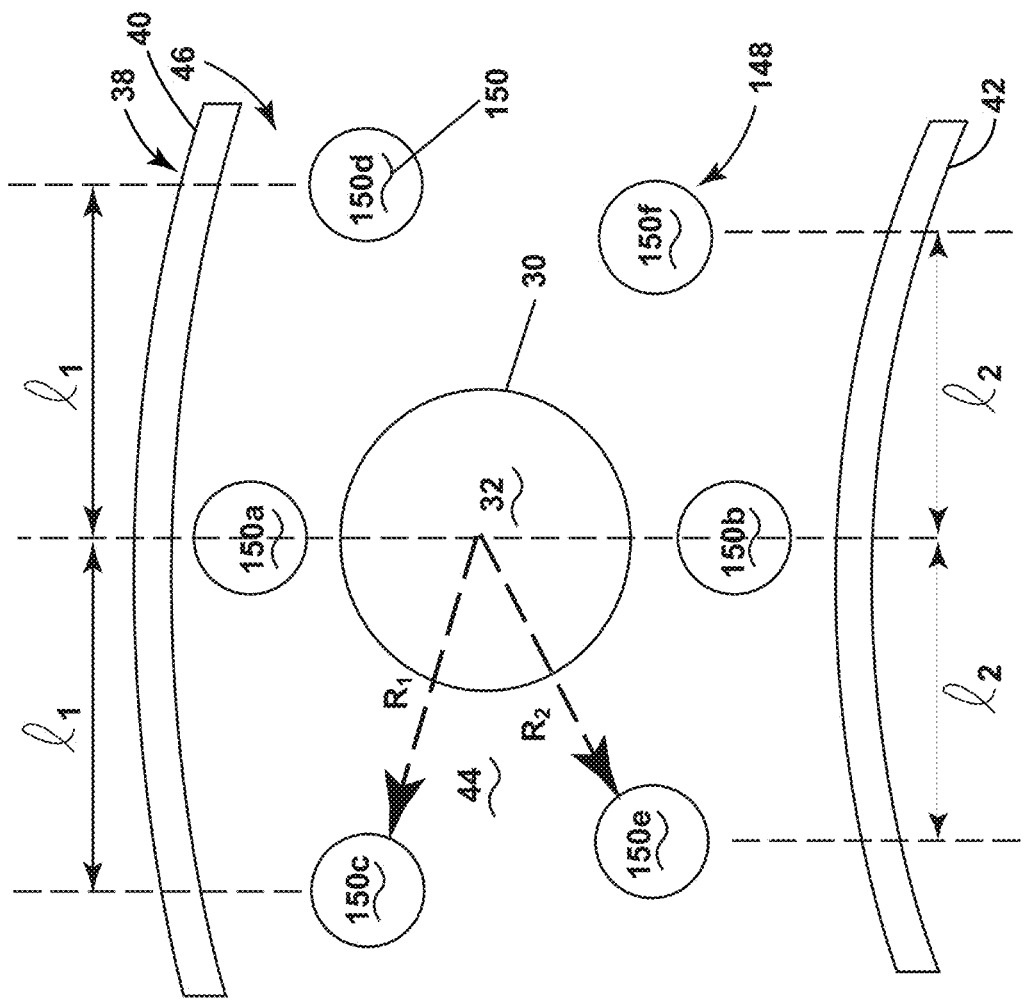
FIG. 8 is an enlarged view of a portion from FIG. 2 illustrating a variation of a layout of the set of lean openings according to one aspect of the disclosure herein.

FIG. 8 is an enlarged view of a portion 88 of FIG. 2 illustrating a variation of a layout of a set of lean openings 148 according to another aspect of the disclosure herein. The set of lean openings 148 is substantially similar to the set of lean openings 48 (FIG. 2), therefore, like parts will be identified with like numerals increased by 100. It should be understood that the description of the like parts of the set of lean openings 48 applies to the set of lean openings 148 unless otherwise noted.

The set of lean openings 148 can be multiple openings located in the dome wall 44, by way of non-limiting example, illustrated are six openings 148 each defining at least one lean cup 150. The set of lean openings 148 can circumscribe the at least one rich cup 32 where a first lean cup 150*a* can be located radially outward and a second lean cup 150*b* can be located radially inward from the at least one rich cup 32. A third and fourth lean cup 150*c*, 150*d* can be circumferentially spaced a first linear distance ($l_1$) from the first lean cup 150*a*. A fifth and sixth lean cup 150*e*, 150*f* can be circumferentially spaced a second linear distance ($l_2$) from the second lean cup 150*b*. In this manner, a first radial distance $R_1$ between the at least one rich cup 32 and the third lean cup 150*c* can be greater than a second radial distance $R_2$ between the at least one rich cup 32 and the fifth lean cup 150*e*. The first linear distance ($l_1$) can be greater than or equal to the second linear distance ($l_2$). The at least one lean cup 150 along with the at least one rich cup 32 can be annularly arranged about the engine centerline 20 (FIG. 2) and fluidly coupled to the combustion chamber 46.

Figure 9:
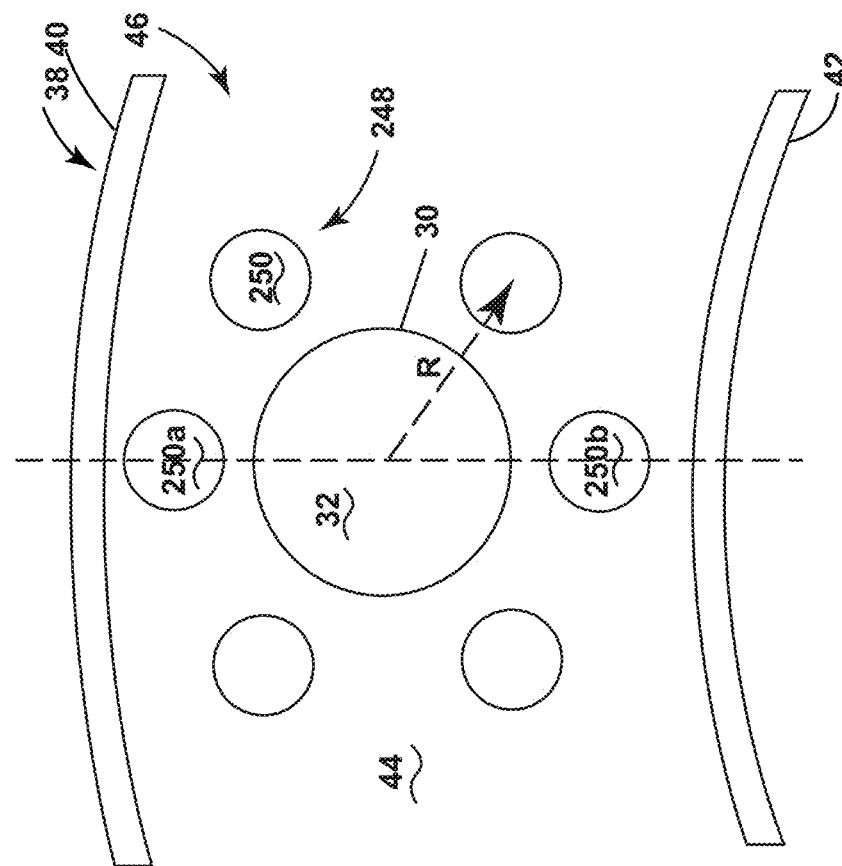
FIG. 9 is an enlarged view illustrating another variation of a layout of the set of lean openings according to another aspect of the disclosure herein.

FIG. 9 is an enlarged view illustrating another variation of a layout of a set of lean openings 248 according to another aspect of the disclosure herein. The set of lean openings 248 is substantially similar to the set of lean openings 48 (FIG. 2), therefore, like parts will be identified with like numerals increased by 200. It should be understood that the description of the like parts of the set of lean openings 48 applies to the set of lean openings 248 unless otherwise noted.

The set of lean openings 248 can be multiple openings located in the dome wall 44, by way of non-limiting example six openings each defining at least one lean cup 250. The set of lean openings 248 can circumscribe the at least one rich cup 32 where at least two lean cups 250 are located radially outward and radially inward from the at least one rich cup 32 and the remaining four are annularly arranged at a constant radius (R) from the first centerline (CL) of the at least one rich cup 32. The constant radius (R) can be less than both the first and the second linear distances ($l_2$, $l_2$) described in the variation of FIG. 8. In other words, the set of lean openings 248 can be annularly arranged about the at least one rich cup at a closer radial location than previously illustrated in FIG. 8. The at least one lean cup 250 along with the at least one rich cup 32 can be annularly arranged about the engine centerline 20 (FIG. 2) and fluidly coupled to the combustion chamber 46.

Figure 10:
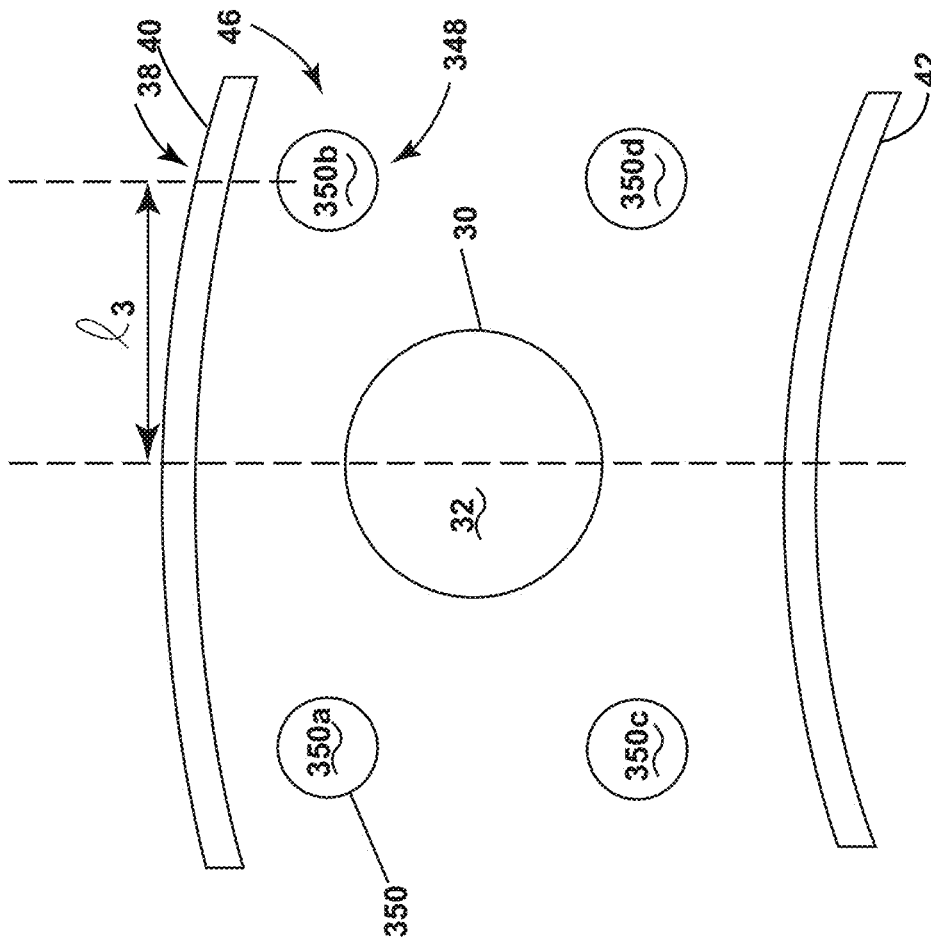
FIG. 10 is an enlarged view illustrating yet another variation of a layout of the set of lean openings according to yet another aspect of the disclosure herein.

FIG. 10 is an enlarged view illustrating yet another variation of a layout of a set of lean openings 348 according to another aspect of the disclosure herein. The set of lean openings 348 is substantially similar to the set of lean openings 48 (FIG. 8), therefore, like parts will be identified with like numerals increased by 300. It should be understood that the description of the like parts of the set of lean openings 48 applies to the set of lean openings 348 unless otherwise noted.

The set of lean openings 348 can be multiple openings located in the dome wall 44, by way of non-limiting example four openings each defining at least one lean cup 350. The set of lean openings 348 can be in an arrangement around the at least one rich cup 32 much like the set of lean openings 148 (FIG. 8), however without the first lean cup 150*a* (FIG. 8) and the second lean cup 150*b* (FIG. 8). In other words, there can be four lean cups 350 flanking the rich cup 32, two lean cups 350*a*, 350*b* radially outward and to the side and two lean cups 350*c*, 350*d* radially inward and to the side. The at least one lean cup 350 along with the at least one rich cup 32 can be annularly arranged about the engine centerline 20 (FIG. 2) and fluidly coupled to the combustion chamber 46.

Any combination of the arrangements of lean cups described herein are contemplated. The rich cup and lean cup arrangements can be in any form described herein.

A method for controlling nitrogen oxides, or $NO_x$ present in combustion gases (G) within the combustor 34, includes injecting the lean fuel/air mixture (L) into the combustion chamber as described herein through the set of lean openings described herein. The method can further includes swirling the lean fuel/air mixture (L) before injection into the combustion chamber. The method can further include mixing the lean fuel/air mixture (L) with the rich fuel/air mixture (R). The lean fuel/air mixture (L) can also be utilized for controlling a flame of the rich fuel/air mixture (R).

Benefits associated with the set of lean openings and methods described herein are a reduction and/or elimination of CO emissions. Further, the arrangement of the set of lean openings described herein contributes to controlling the flame produced by $H_2$ fuel to achieve lower $NO_x$, lower dynamics and better component life. Combining rich and lean cups provides the benefit of a consistent flame produced by the rich cup and the small amount of pollutants provided by a flame produced by the lean cups. The rich fuel provides a more consistent flame, which does not blow out, but it creates more pollutants. The lean flame has less pollutants, but can blow out. Mixing them gives you a better performing engine. The rich burn also helps keep the lean fuel burning as it provides a constant flame.

While described with respect to a turbine engine, it should be appreciated that the combustor as described herein can be for any engine with a having a combustor that emits $NO_x$. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine comprising a compressor section, a combustion section, and a turbine section in serial flow arrangement and collectively defining an engine centerline, the combustion section comprising a combustor liner at least partially defining a combustion chamber; a plurality of spaced rich cups fluidly coupled to the combustion chamber; and a plurality of lean cups interspersed amongst the spaced rich cups.

The gas turbine engine of any preceding clause, further comprising a dome wall coupled to the combustor liner further defining the combustion chamber, with the plurality of lean cups located in the dome wall.

The gas turbine engine of any preceding clause, further comprising a passage extending between at least one passage inlet and a passage outlet at the dome wall to define at least one lean opening in the plurality of lean cups.

The gas turbine engine of any preceding clause, further comprising at least one channel fluidly coupling the at least one fuel chamber to the passage.

The gas turbine engine of any preceding clause wherein each rich cup in the plurality of rich cups defines a primary centerline radially spaced from the engine centerline and wherein the passage defines a secondary centerline angled toward the primary centerline and intersecting the primary centerline to define a passage angle.

The gas turbine engine of any preceding clause wherein the at least one passage inlet is multiple passage inlets circumferentially disposed with respect to the secondary centerline around the passage.

The gas turbine engine of any preceding clause wherein each passage inlet defines a third centerline intersecting the inner surface at a shallow angle and wherein the shallow angle is equal to or less than 30 degrees.

The gas turbine engine of any preceding clause wherein each passage inlet defines a third centerline intersecting the inner surface at a perpendicular angle and wherein the perpendicular angle is between 85 and 95 degrees.

The gas turbine engine of any preceding clause wherein each of the multiple passage inlets are disposed such that the third centerline intersects the inner surface opposite the corresponding passage inlet.

The gas turbine engine of any preceding clause wherein at least one of the multiple passage inlets is unaligned with the secondary centerline.

The gas turbine engine of any preceding clause wherein at least one of the multiple passage inlets is aligned with the secondary centerline and intersects the secondary centerline.

A gas turbine engine comprising a compressor section, combustion section, and turbine section in serial flow arrangement and collectively defining an engine centerline, the combustion section comprising a combustor liner at least partially defining a combustion chamber; a dome wall coupled to the combustor liner and having a dome inlet; at least one rich cup fluidly coupled to the combustion chamber at the dome inlet; a plurality of openings arranged about the at least one rich cup; and a passage extending between a passage inlet and a passage outlet, the passage outlet defining at least one lean cup in the plurality of openings.

The gas turbine engine of any preceding clause, wherein the at least one opening in the plurality of openings defines a dilution hole in an off position and defines a lean cup in an on position.

The gas turbine engine of any preceding clause, further comprising at least one fuel chamber provided within the dome wall and fluidly coupled to the at least one lean fuel cup.

The gas turbine engine of any preceding clause wherein the at least one rich cup is a plurality of rich cups and the plurality of openings is multiple sets of lean cups arranged circumferentially about the engine centerline, each set of lean cups associated with a singular rich cup.

The gas turbine engine of any preceding clause wherein each set of lean cups comprises at least one lean cup spaced a first linear distance from the singular rich cup and another at least one lean cup spaced a second linear distance from the at least one rich cup.

The gas turbine engine of any preceding clause wherein the first linear distance is different than the second linear distance.

The gas turbine engine of any preceding clause wherein each set of lean cups further comprises a first lean cup spaced radially outward from the singular rich cup and a second lean cup spaced radially inward from the singular rich cup.

The gas turbine engine of any preceding clause wherein the first linear distance is equal to the second linear distance.

The gas turbine engine of any preceding clause wherein the at least one lean cup is an array of lean cups annularly arranged a radial distance about the singular rich cup.

What is claimed is:

1. A gas turbine engine comprising:
a compressor section, a combustion section, and a turbine section in serial flow arrangement and collectively defining an engine centerline, the combustion section comprising:
a combustor liner at least partially defining a combustion chamber;
a plurality of spaced rich cups fluidly coupled to the combustion chamber;
a plurality of lean cups interspersed amongst the spaced rich cups; a dome wall coupled to the combustor liner further defining the combustion chamber, with the plurality of lean cups located in the dome wall; and
a fuel chamber defined by the dome wall and fluidly coupled to at least one lean cup of the plurality of lean cups.

2. The gas turbine engine of claim 1, further comprising a passage having an inner surface, the passage extending between at least one passage inlet and a passage outlet at the dome wall to define at least one lean opening in the plurality of lean cups.

3. The gas turbine engine of claim 2, further comprising at least one channel fluidly coupling the at least one fuel chamber to the passage.

4. The gas turbine engine of claim 2, wherein each rich cup in the plurality of spaced rich cups defines a primary centerline radially spaced from the engine centerline and wherein the passage defines a secondary centerline angled toward the primary centerline and intersecting the primary centerline to define a passage angle.

5. The gas turbine engine of claim 4, wherein the at least one passage inlet is multiple passage inlets circumferentially disposed with respect to the secondary centerline around the passage.

6. The gas turbine engine of claim 5, wherein each passage inlet of the multiple passage inlets defines a third centerline intersecting the inner surface at a shallow angle and wherein the shallow angle is equal to or less than 30 degrees.

7. The gas turbine engine of claim 5, wherein each passage inlet of the multiple passage inlets defines a third centerline intersecting the inner surface at an angle and wherein the angle is between 85 and 95 degrees.

8. The gas turbine engine of claim 5, wherein each passage inlet defines a third centerline and each of the multiple passage inlets are disposed such that the third centerline intersects the inner surface opposite the corresponding passage inlet.

9. The gas turbine engine of claim 5, wherein at least one of the multiple passage inlets is unaligned with the secondary centerline.

10. The gas turbine engine of claim 5, wherein at least one of the multiple passage inlets is aligned with the secondary centerline and intersects the secondary centerline.

11. The gas turbine engine of claim 1, wherein the dome wall includes a dome inlet and the plurality of spaced rich cups is fluidly coupled to the combustion chamber at the dome inlet.

12. The gas turbine engine of claim 1, further comprising a plurality of openings arranged about at least one rich cup in the plurality of spaced rich cups.

13. The gas turbine engine of claim 12, wherein at least one opening in the plurality of openings defines a dilution hole.

14. The gas turbine engine of claim 1, wherein the plurality of lean cups comprises multiple sets of lean cups arranged circumferentially about the engine centerline and each set of the multiple sets of lean cups is associated with a singular rich cup of the plurality of spaced rich cups.

15. The gas turbine engine of claim 14, wherein each set of the multiple sets of lean cups comprises at least one lean cup spaced a first linear distance from a rich cup of the plurality of spaced rich cups and another at least one lean cup spaced a second linear distance from the rich cup of the plurality of spaced rich cups.

16. The gas turbine engine of claim 15, wherein the first linear distance is different than the second linear distance.

17. The gas turbine engine of claim 16, wherein each set of the multiple sets of lean cups further comprises a first lean cup spaced radially outward from the rich cup of the plurality of spaced rich cups and a second lean cup spaced radially inward from the rich cup of the plurality of spaced rich cups.

18. The gas turbine engine of claim 1, wherein the plurality of lean cups define arrays of lean cups with each array of the arrays of lean cups annularly arranged a radial distance about a rich cup of the plurality of spaced rich cups.

* * * * *